United States Patent
Tashiro et al.

[11] Patent Number: 5,703,308
[45] Date of Patent: Dec. 30, 1997

[54] KARAOKE APPARATUS RESPONSIVE TO ORAL REQUEST OF ENTRY SONGS

[75] Inventors: Masashi Tashiro; Hirokazu Kato, both of Hamamatsu, Japan

[73] Assignee: Yamaha Corporation, Hamamatsu, Japan

[21] Appl. No.: 550,826

[22] Filed: Oct. 31, 1995

[30] Foreign Application Priority Data

Oct. 31, 1994 [JP] Japan .................................. 6-267259

[51] Int. Cl.$^6$ .................................................. G10H 3/00
[52] U.S. Cl. ........................... 84/609; 84/634; 434/307 A
[58] Field of Search ...................... 84/601–602, 609–610, 84/615–618, 634; 434/307 A

[56] References Cited

U.S. PATENT DOCUMENTS 5,250,745  10/1993  Tsumura .................................. 84/603

FOREIGN PATENT DOCUMENTS

| 2282988 | 11/1990 | Japan . |
| 3012890 | 1/1991 | Japan . |
| 6089096 | 3/1994 | Japan . |
| 6-161482 | 6/1994 | Japan . |
| 6161482 | 6/1994 | Japan . |

*Primary Examiner*—William M. Shoop, Jr.
*Assistant Examiner*—Marlon T. Fletcher
*Attorney, Agent, or Firm*—Loeb & Loeb LLP

[57] ABSTRACT

A Karaoke apparatus responds to a request message for performing an entry song. The Karaoke apparatus has a music data storage for storing music data representative of a plurality of entry songs, and a reference data storage for storing reference data representative of a multiple of key items which specify the entry songs. A microphone is provided for collecting an oral request message and for converting the same into a corresponding voice signal. The voice signal is analyzed to extract therefrom key information which suggests a desired entry song. The reference data storage is searched to detect coincidence between the key information and at least one of the key items to thereby identify the desired entry song. The Karaoke apparatus retrieves music data of the desired entry song from the music data storage to perform the desired entry song according to the retrieved music data.

20 Claims, 5 Drawing Sheets

KARAOKE APPARATUS RESPONSIVE TO ORAL REQUEST OF ENTRY SONGS

BACKGROUND OF THE INVENTION

The present invention relates to a Karaoke apparatus (i.e., sing-along apparatus) capable of music-select operation with a voice input of oral request message.

One of approaches to the Karaoke apparatus for designating a desired entry song will be briefly described below. Previously, there are prepared a list book of Karaoke entry songs which are reserved within an internal memory of the apparatus or which are readily available for reproduction. A manual commander such as an infrared remote controller is utilized for inputting a request command to the Karaoke apparatus with reference to the prepared list book. In operation, a singer selects a desired entry song from the list of the Karaoke music in terms of a song title or the like. Then, the singer operates the infrared remote commander to input a song code which corresponds to the selected song title. The infrared remote controller transmits the song code to the Karaoke apparatus.

However, the singer needs to input an approximately 6 to 8 digits of the song code consisting of numerals and alphabets by actuating several control keys, and this is difficult to operate. Further, when the singer does not know or forgets a title of the desired entry song, the singer cannot designate the desired entry song, since the list book only prescribes song codes which are labeled by the song titles.

SUMMARY OF THE INVENTION

Therefore, an object of the present invention is to provide a Karaoke apparatus which can select a desired entry song even if the song title is not known by simple oral operation so that manual command operation can be eliminated.

In the present invention, there is provided a Karaoke apparatus responsive to a request message for performing an entry song. The Karaoke apparatus comprises a music data storage device that stores music data representative of a plurality of entry songs, a reference data storage device that stores reference data representative of a multiple of key items which specify the entry songs, a collecting device that includes a microphone for collecting an oral request message and for converting the same into a corresponding voice signal, an extraction device that analyzes the voice signal to extract therefrom key information which suggests a desired entry song, a search device that searches the reference data storage device to detect coincidence between the key information and at least one of the key items to thereby identify the desired entry song, and a performance device that retrieves music data of the desired entry song from the music data storage device to perform the desired entry song according to the retrieved music data.

According to the present invention, the Karaoke apparatus reserves a plurality of Karaoke entry songs in the music data storage device, and memorizes multiple kinds of the key items for each entry song in the reference data storage device. In the Karaoke apparatus, a desired entry song is selected by searching the reference data storage device according to the key information inputted by a user. The music selection is conducted by orally inputting the key information from the microphone which is normally used for picking up a singing voice. When the oral request message is inputted from the microphone, the key information is extracted from the oral request message by the extraction device. The reference data storage device is searched according to the inputted key information to identify the entry song which is suggested by the oral request message. Thus, reproduction of the music data is performed according to the user's intention.

DETAILED DESCRIPTION OF THE INVENTION

Figure 1:
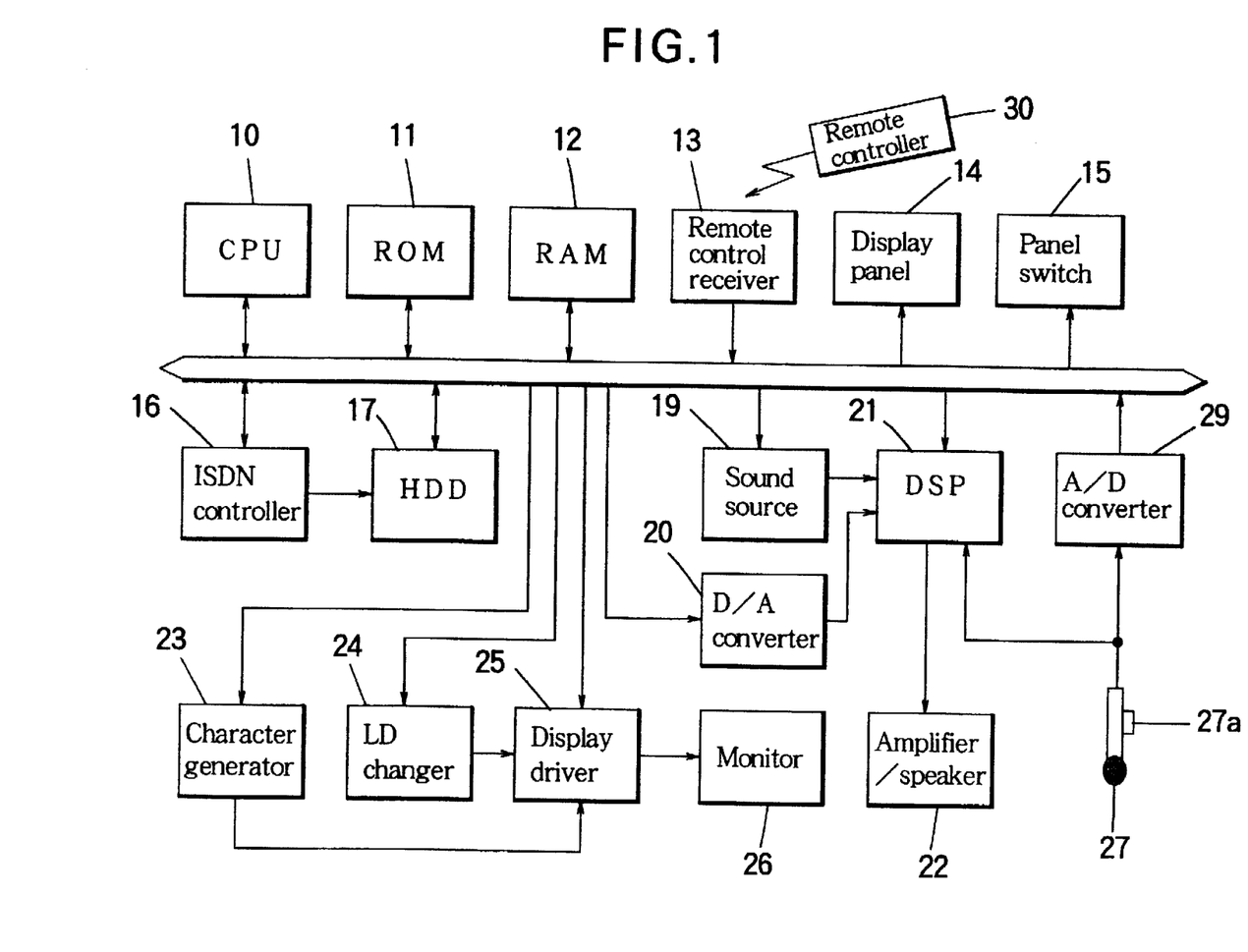
FIG. 1 is a block diagram of a Karaoke apparatus according to an embodiment of the present invention.

FIG. 1 is a block diagram of a Karaoke apparatus according to an embodiment of the present invention. This Karaoke apparatus is a communication type soundsource Karaoke apparatus. The soundsource Karaoke apparatus stores music data containing instrument tone data and vocal data for actuating an internal sound source and a D/A converter. The sound source generates Karaoke accompaniment sound by sequentially reading out the tone data. The D/A converter generates back chorus sound or the like according to the vocal data. Further, the communication type Karaoke apparatus means that the Karaoke apparatus is connected to a host station through a communication line such as ISDN line to download the music data including the tone data from the host station. The Karaoke apparatus has a hard disk drive (HDD) 17 capable of storing music data representative of hundreds to thousands of entry songs so that the downloaded music data can be reserved in the HDD.

The Karaoke apparatus can input a request command for music selection from a manual commander such as an infrared remote controller 30. Further, the Karaoke apparatus can collect and admit an oral request message for music selection by inputting a voice signal from a microphone 27 which is normally used for collecting a singing voice during Karaoke performance. For example, when a user pronounces a music title before the microphone, the Karaoke apparatus recognizes the pronunciation of the music title, and starts performance of the Karaoke song corresponding to the recognized music title.

In detail, a CPU 10 controls entire operation of the Karaoke apparatus. The CPU 10 is connected through a bus to a ROM 11, a RAM 12, a hard disk drive (HDD) 17, an ISDN controller 16, a remote control receiver 13, a display panel 14, a panel switch 15, a sound source 19, a D/A converter 20, a digital signal processor (DSP) 21, a character generator 23, a Laser Disc (LD) changer 24, a display driver 25 and an A/D converter 29.

The ROM 11 stores a system program, various application programs, a loader program and font data. The system program controls basic operation and data send/receive operation associated with peripherals. The application programs include, for example, a sequence program and a speech recognition program. The sequence program contains a main sequence program, a music sequence program, a character sequence program, a vocal sequence program and a DSP sequence program. At the time of Karaoke performance, the respective sequence programs are executed in parallel by the CPU 10 to replay audio and video parts of Karaoke performance based upon the music data. The loader program is used for downloading the music data from the host station. The speech recognition program is used to analyze a digital voice signal fed from the A/D converter 29. For example, phonetic elements contained in the voice signal are detected to extract key information from an oral request message in the form of a key word such as a song title represented by the detected phonetic elements. Further, tone elements contained in the voice signal are detected to extract key information from the oral request message in the form of a key melody pattern which represents a lead or top melody part of a desired entry song. The font data represent plural kinds of character fonts like a Mincho typeface and a round-bold typeface such that the lyric words or title of the song can be displayed by using the font data. The RAM 12 provides a work area therein for the CPU 10, while the HDD 17 stores a music data file for reserving hundreds to thousands of entry songs. The HDD 17 further stores reference data representative of a multiple of key items which specify the entry songs. In detail, the HDD 17 stores a multiple of reference data tables corresponding to the multiple of the key items.

The ISDN controller 16 is used to communicate with the host station through the ISDN line so that the music data or other data can be downloaded from the host station. The ISDN controller 16 contains a DMA circuit to write the downloaded music data or application programs directly into the HDD 17, not via the CPU 10.

The remote control receiver 13 receives an infrared signal sent from a remote controller 30, and restores a request command and other commands and data. The remote controller 30 sends the request command for music selection and the like. The manual controller 30 is used in the Karaoke apparatus supplementally to the oral request message inputted from a microphone 27. The remote controller 30 is provided with key switches including a command switch for music selection and ten-key switches. Therefore, when a user operates these switches, the request command in the form of a song code is generated as an infrared signal in response to the user's operation. The display panel 14 is provided on the front side of the Karaoke apparatus to display, for example, the admitted song code currently on process and the total number of booked or requested entry songs. The panel switch 15 is also provided on the front side of the Karaoke apparatus, including a song code input switch and a tone key changing switch.

The sound source 19 receives the tone data contained in the music data to generate a musical tone signal. The D/A converter 20 receives the vocal data contained in the same music data to convert the vocal data into a musical voice signal. The vocal data is formed of ADPCM data which is converted into the analog musical voice signal representative of a back chorus or the like. The microphone 27 is connected to the DSP 21 to collect a singing voice signal originating from a singer. The DSP 21 imparts sound effects such as reverb and echo to those of the musical tone signal fed from the sound source 19, the musical voice signal fed from the D/A converter 20 and the singing voice signal fed from the microphone 27. The type and degree of the effects imparted by the DSP 22 are controlled based upon DSP control data contained in the music data. The tone signal and the voice signals to which the sound effects have been applied are mixed together and outputted to an amplifier/speaker 22. The amplifier/speaker 22 amplifies and sounds the mixed musical signals.

The microphone 27 is also connected to the A/D converter 29. The A/D converter 29 is operated under the music selection mode so as to convert the analog voice signal inputted from the microphone 27 into a digital voice signal, which is then fed to the CPU 10. The CPU 10 then runs the speech recognition program for analyzing and recognizing contents of the voice signal.

The character generator 23 generates a character pattern based upon character data fed from the CPU 10. The character data fed from the CPU 10 to the character generator 23 contains a title and lyric words of the Karaoke song currently in replay, as well as a next title or a title proposed. On the other hand, the LD changer 24 reproduces a background video signal from an LD based upon video-select data in terms of a chapter number or the like fed from the CPU 10. The video-select data is determined based upon category data and the like of the corresponding Karaoke song. The LD changer 24 can selectively access five pieces of Laser Discs to reproduce background video pictures of one hundred twenty scenes in total. One of the background video pictures is then selected by the video-select data. After that, the character pattern and the background video picture are fed to the display driver 25. The display driver 25 synthesizes the character pattern and the video picture together by means of superimpose to display the composite picture on a monitor 26.

Figure 2A:
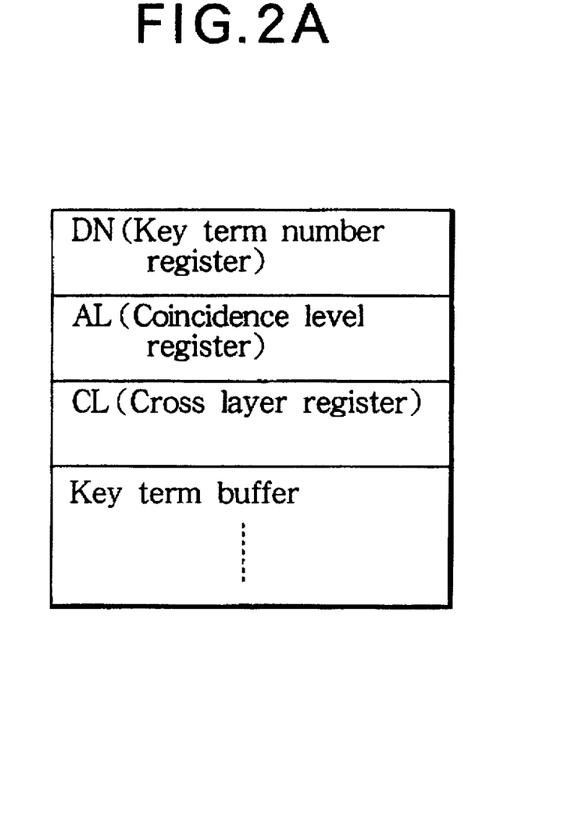
FIGS. 2A and 2B are diagrams showing structures of a RAM and an HDD in the Karaoke apparatus of FIG. 1.
Figure 2B:
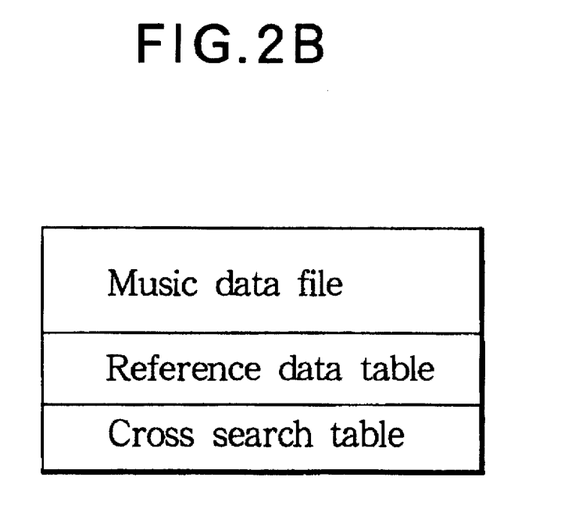

FIGS. 2A and 2B show representative internal structures of the RAM 12 and the HDD 17. As shown in FIG. 2A, the RAM 12 sets therein a key term number register DN, a coincidence level register AL, a cross layer register CL, and a key term buffer. The register DN registers the number of key terms inputted from the microphone 27 in the music-select mode. The coincidence level is used as an index which indicates how well the inputted key term matches a corresponding key item when searching the reference data table in the HDD 17 for a desired entry song. In the present embodiment, there are three coincidence levels 1 to 3. In other words, the level 1 indicates perfect coincidence or full matching between the orally inputted key term and the stored key item. The level 2 indicates almost perfect coincidence except for one character. The level 3 indicates partial coincidence with respect to a forward part of the key term and the key item. The cross layer register CL indicates whether two or more key terms should be cross-searched. The key term buffer is composed of a FIFO buffer so that the CPU can sequentially read out the key terms inputted from the microphone 27 in due order from the first to the last.

Figure 3:
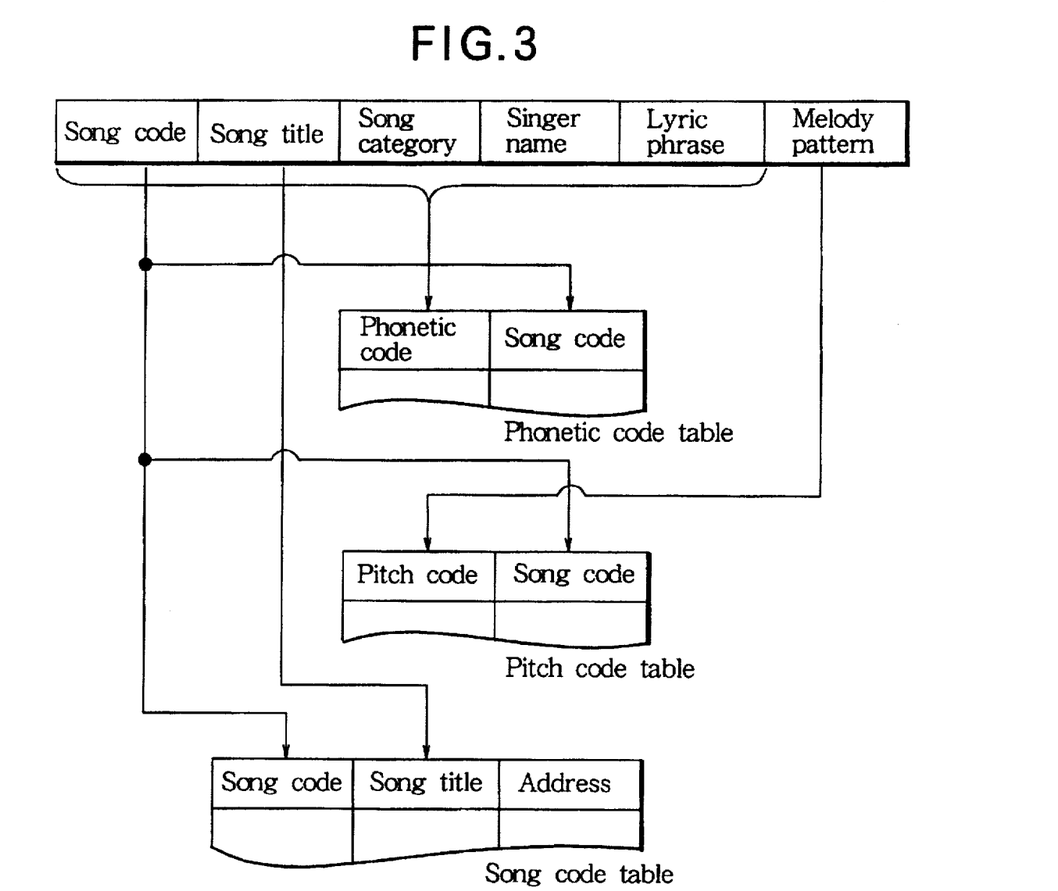
FIG. 3 is a diagram showing a structure of a reference data table installed in the Karaoke apparatus shown in FIG. 1.

On the other hand, as shown in FIG. 2B, the HDD 17 sets therein a music data file, a reference data table, and a cross-search table. The music data file stores hundreds to thousands of entry songs. The reference data table stores, as shown in FIG. 3, key items effective to specify and discriminate the hundreds to thousands of the entry songs. The cross-search table is created according to results of the search operation under the music selection mode. As a result of search by one inputted key term, if two or more of entry songs are selected, then a cross-search table is newly created by gathering key items associated only with the selected entry songs. Then, the cross-search table is searched in limited and quick manner according to a next key term to uniquely identify one entry song.

FIG. 3 shows the reference data table set in the HDD 17. The reference data table is composed of a phonetic code table, a pitch code table and a song code table. In these tables, several key items are stored for specifying each entry song, such as song code, song title, song category, singer name, leading song lyric phrase, and leading song melody pattern.

The song code has one-to-one correspondence to the respective entry song. The song code is inputted from the remote controller 30 at the time of music selection. The song code is listed up in the content book prepared for the Karaoke apparatus. The song category indicates a category of each entry song in terms of pops or Enka (sentimental popular song), or in terms of solo and duet. The singer name indicates a name of the singer who originally sings the entry song.

These song title, song category, singer name and lyric phrase are phonetically coded to form the key words. These key words are stored in the phonetic code table. Further, the song code is also prescribed in the phonetic code table in correspondence with these key words. The key words or phonetic codes symbolize pronunciations of the song titles, the lyric phrase and the like by phonetic signs such as Kana (Japanese syllabary). On the other hand, the song codes stored in correspondence to the phonetic codes are code data consisting of numerals and alphabets in general. In the table, all of the reference data are not layered or sorted in an organized structure by data type such as the song title and the song category, but are stored in phonetic order, e.g., in alphabetical order or in order of Japanese syllabary. In other words, the voice signal inputted from the microphone 27 is processed as a phonetic code to extract therefrom phonetic elements through the A/D converter 29 with the aid of the speech recognition program, so that the data type or meaning could not be determined by only the voice signal. For this reason, all of the phonetic codes are tabled and searched mechanically without regard to their data type or meaning.

In the pitch code table, a lead part of melody of each entry song is coded in terms of tone pitch to form the key melody pattern or pitch code. The pitch code is prescribed in the pitch code table in correspondence with the song code. The pitch code is denoted by a value of one-increment or one-decrement per semitone for the lead part of the melody such that a tone element C3 is denoted by a value 64. On the other hand, the song code table stores the song code of each entry song together with a corresponding song title and an address to the music data of each entry song. The song title is prescribed by character codes for display purpose. The address is used for retrieving the music data of each entry song from the music data storage according to the song code. This song code table is used to display a song title of the selected or designated entry song. This table is further utilized to designate a storage location of the music data of the entry song when the same has been designated as the results of the search using the phonetic code table and the pitch code table, or designated by direct or manual input of the song code by operating the remote controller 30 or the panel switch 15.

Input of the voice signal from the microphone 27 in the music selection mode causes the A/D converter 29 to digitize the analog voice signal. When the digitized voice signal is fed to the CPU 10, the CPU 10 executes the speech recognition program so that the speech sounds to be recognized as a word will be extracted and phonetically coded into a key word. Further, a frequency change to be recognized as a melody in the voice signal will be extracted and coded into a key melody pattern. A plurality of voice signals can be inputted sequentially or continuously so that multiple-search or cross-search will be performed for two or more of the inputted key terms.

The search is performed in a plurality of steps including the initial step of full matching and subsequent steps where the matching condition or level is lowered stepwise until the desired entry song is found. In the embodiment, three steps of the search are performed per one inputted key term. The search includes step 1 of full or perfect matching, step 2 of almost full matching but one word difference, and step 3 of forward part matching. When the requested song is found in a preceding step, then succeeding steps of the search are saved. For example, when the desired entry song is found according to the key item fully matching or coincident to the inputted key term in the step 1, then the search of step 2 is not performed. However, when no corresponding entry song is found even if these three steps of the search have been done, the inputted key term will be identified as improper one and canceled. As a result of the search, if a plurality of corresponding entry songs are inferred, then all of the key items of the corresponding entry songs are extracted to form a new music select table or cross search table. Accordingly, the search is performed by using another inputted key term, if available, in the cross search table and repeated until one entry song is finally specified.

In addition, if the number of inferred or suggested entry songs is 10 or less, a list of those song titles will be displayed on the monitor 26 together with serial numbers 1, 2, 3, . . . and the assigned song codes. The user can watch the display and select one by oral designation of a particular serial number or oral input of a particular song code.

Figure 4:
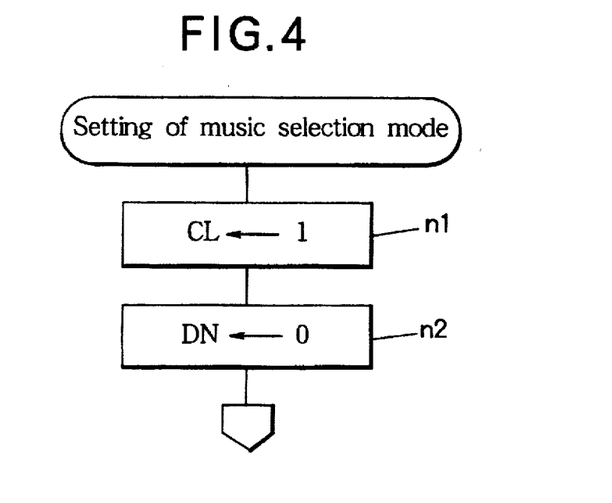
FIG. 4 is a flow chart showing an operation of the Karaoke apparatus shown in FIG. 1.
Figure 5:
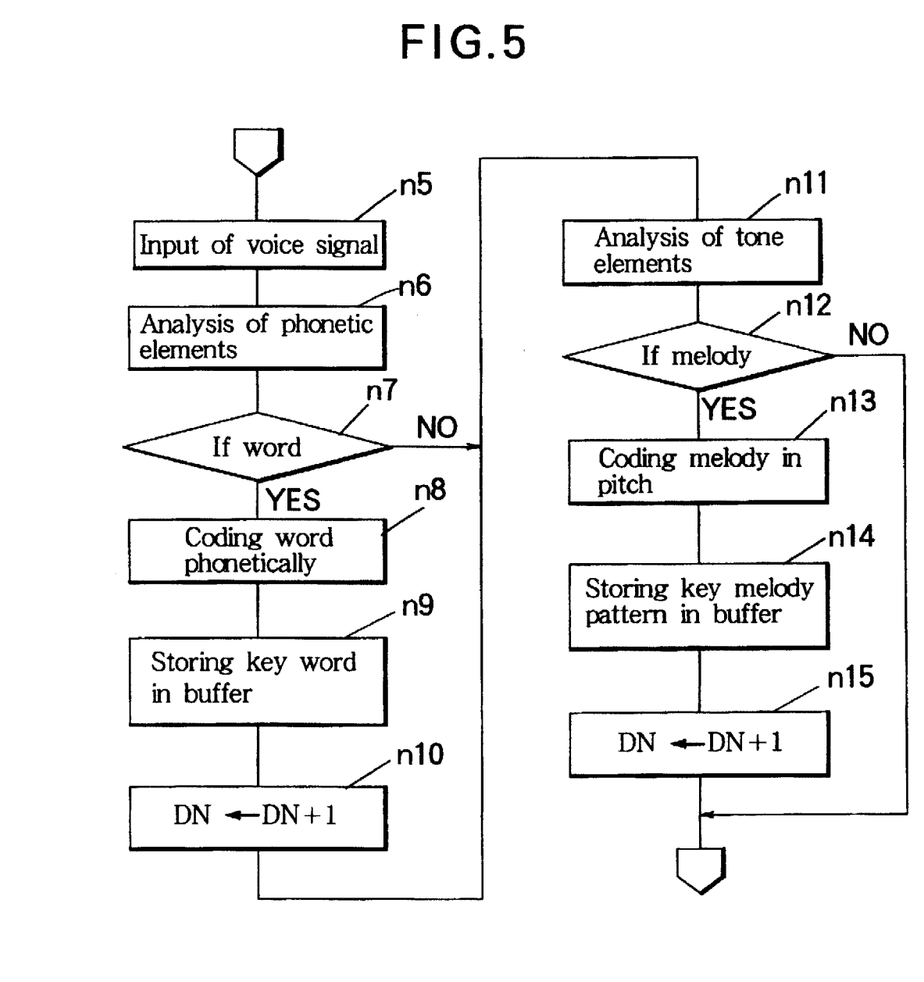
FIG. 5 is a flow chart showing another operation of the Karaoke apparatus shown in FIG. 1.
Figure 6:
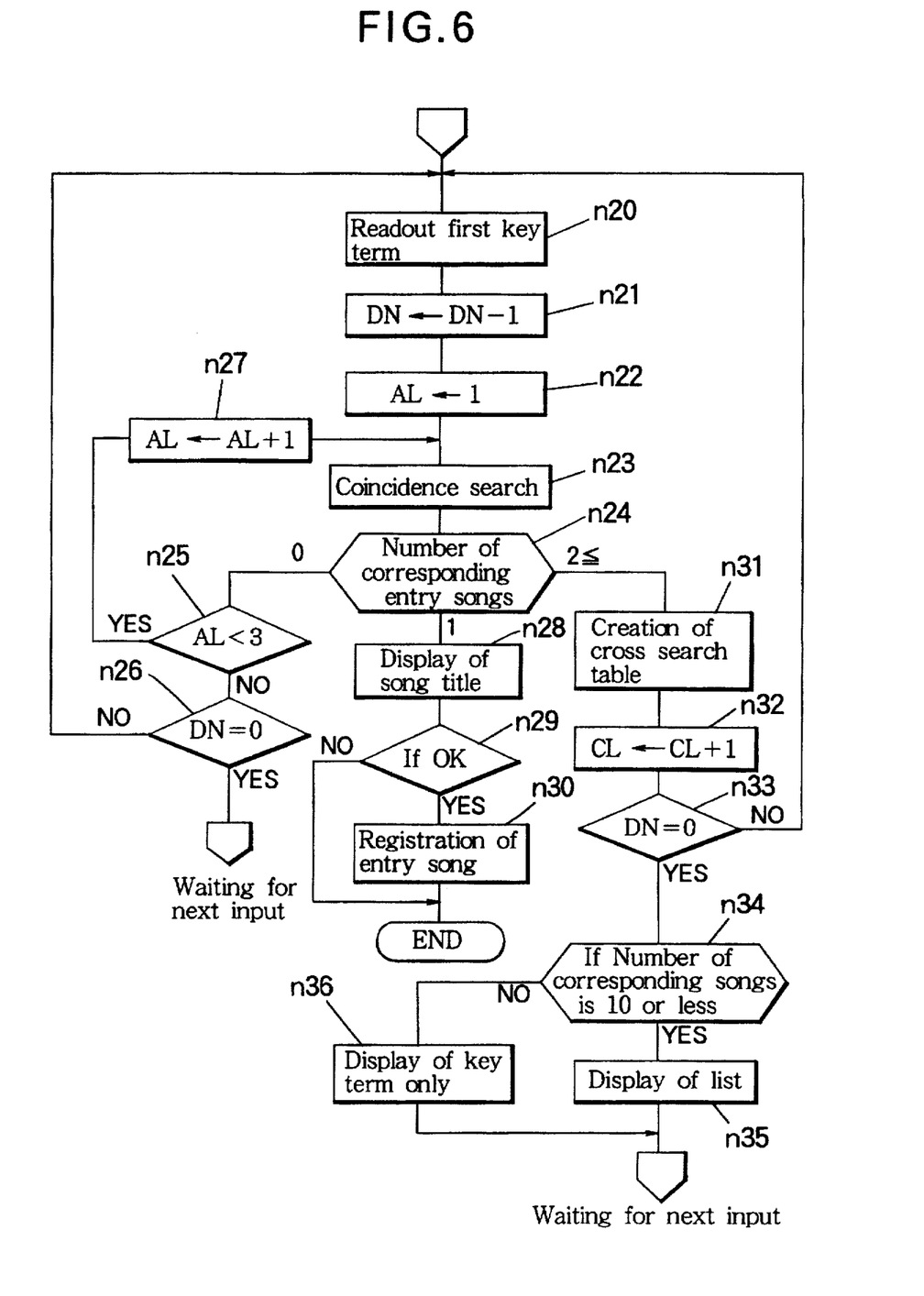
FIG. 6 is a flow chart showing a further operation of the Karaoke apparatus shown in FIG. 1.

Next, FIGS. 4 to 6 are flow charts showing operations of the Karaoke apparatus in the music selection mode. Setting of the music selection mode may be performed by orally inputting a command message like "music selection" from the microphone 27. Otherwise, a three-way hand switch 27a of the microphone 27 is set to a position of the music-selection mode between positions of OFF and ON. In the position of the music-select mode, the microphone 27 is electrically turned on, and the voice signal is fed to the A/D converter 29 so that the CPU 10 can perform the operation of the music-select mode as shown in FIGS. 4 to 6. In this case, switching the hand switch 27a from the position of the music-select mode to another position results in release of the music-select mode.

In addition, the operation of the music-select mode can be processed in parallel to other operations based on the sequence programs mentioned before. This makes it possible to input the key information from another microphone than that the singer uses during play of Karaoke music.

FIG. 4 is a flow chart showing setting operation of the music selection mode. In order to set the music selection mode, the cross layer register CL is set to "1" (n1), and the key term number register DN is then set to "0" (n2).

FIG. 5 is a flow chart showing speech recognition operation. At first, the user inputs an oral request message by speech from the microphone 27. That is, the user speaks his or her desired song title or top lyric words, or hums the beginning of the melody into the microphone 27. The analog voice signal fed from the microphone 27 is converted into a digital voice signal via the A/D converter 29. The digital voice signal is then fed to the CPU 10 (n5). In the CPU 10, phonetic elements of the digital voice signal are analyzed (n6) to determine whether there is a sound recognizable as a word or not (n7). If YES, the word is phonetically coded (n8), and the thus coded word is written as a key word into the key term buffer (n9). Furthers the value "1" is added to the key term number register DN (n10). Next, a change in frequency of the voice signal is analyzed to determine whether there are tone elements of a melody in the inputted or collected voice signal (n11). The existence of the melody is determined by analyses of whether or not the change in frequency is within a range capable of quantization of a 12-semitone pitch, and whether or not the change in frequency is repeated at a constant tempo. If YES (n12), the melody is coded in terms of pitch (n13). The coded key melody pattern is registered in the key term buffer (n14). The key melody pattern is denoted by a sequence of pitch codes such that one tone element C3 of the melody pattern is denoted by a pitch code "64" according to MIDI standard. The key term buffer is composed of FIFO. After that, the value "1" is added to the key term number register DN (n15).

FIG. 6 is a flow chart showing search operation. This operation is carried out in parallel to the above described speech recognition operation. During the operation, the first registered key term is first read out from the key term buffer (n20). Then, the value "1" is subtracted from the key term number register DN (n21). The coincidence or matching level register AL is then set to "1" indicative of the full matching (n22) so that the reference data table can be searched as to whether or not there is a key item perfectly corresponding to the key term in the complete coincidence level (n23). The reference data table selected at this time is either of the phonetic data table in case that the inputted key term is a phonetic code, or the pitch code table in case that the inputted key term is a pitch code. After the search of the full matching, the number of corresponding entry songs is determined (n24). If the number is 0, this indicates that no corresponding entry song is found so that the coincidence level is turned to one level down. Namely, the value "1" is added to the AL (n27) to repeat the matching search operation (n23). At this time, if the coincidence level has already reached the lowest level 3, the search by the outstanding key term is canceled (n25), because it is considered that a desired song requested by the user cannot be found any longer even if the search is continued. In this case, if there is a next key term (DN>0) (n26), the next key term will be retrieved for another search, while the routine returns to the step n20. If there is no other key term (DN=0), the procedure waits for an input of a subsequent key term.

On the other hand, as the result of the matching search of the step n23, if the number of the corresponding entry song is 1, the monitor displays the song title of the corresponding entry song and the outstanding key term used for the search (n28). The user inputs OK sign in response to the display (n29), and thereby the requested entry song is exactly identified and confirmed. The user then executes registration of the requested song for Karaoke replay (n30) by pushing a return key. However, if the user does not input the OK sign, the operation will be finished without the registration of the requested song.

As the result of the matching search at the step n23, if the number of the corresponding entry songs is 2 or more, the key items of the corresponding entry songs are extracted from the reference data table, and then the cross search table is created for the next matching search (n31). Further, the value "1" is added to the cross layer register CL (n32). At this time, if DN≠0, the operation from the step n20 is repeated (n33). If DN=0, a list of all the corresponding entry songs is displayed (n35) only when the number thereof is 10 or less (n34). The list prescribes song titles and song codes of the nominated entry songs, serial numbers assigned to the nominated songs, and the key term used for this nomination. In such a case, a particular serial number may be inputted next time to select one of the nominated entry songs. If the number of the nominated songs is more than 10, only the key term used for the nomination is displayed (n36) to wait for next input of another key term. In the above operations, the setting of the music selection mode and the input of the voice signal from the microphone 27 make it possible to achieve the music selection.

As an aside, in the present embodiment, though the reference data type is left out of consideration when a plurality of key terms are received, the search can be prevented from using the same type of reference data twice or more times. In this case, the Karaoke apparatus may not accept a new key term of the same type if the desired song is successfully designated by a previous key term under the complete matching. On the other hand, the Karaoke apparatus may accept a new key term of the same type if a possible entry song is searched by a previous key term under the coincidence level 2 or 3.

The above described embodiment includes the following features. Namely, the Karaoke apparatus has display means for displaying song information including song titles when a plurality of entry songs are suggested by the search means. In detail, the display means is operated when the search means identifies more than one entry song for displaying all of the identified entry songs so that the collecting means may collect another oral request message effective to select one of the identified entry songs. Further, in modification, the Karaoke apparatus is characterized in that the extraction means extracts a multiple of key terms from the speech, and the search means specifies the entry song corresponding to all of the multiple of the key terms. Stated otherwise, the requested entry song is specified when perfect coincidence is detected between the multiple of the key terms and the stored key items.

There is a case that one entry song cannot be selected from only one key term. However, in such a case, the plurality of possible, inferred entry songs are displayed. Then, the Karaoke apparatus again executes next operations of the collecting means, the extraction means, and the search means. At last, one entry song can be securely selected out of the plurality of the suggested or inferred entry songs. In addition, in the application of the invention, the extraction means extracts a plurality of key terms from the speech so that the user can input the plurality of the key terms simultaneously. The reference data storage means is searched according to the plurality of the different key terms to infer the entry song corresponding to all of the plurality of the key terms. Accordingly, it is possible to select one entry song quickly and securely.

As described above, according to the present invention, the music data storage can be searched by inputting key information from a microphone to infer one entry song, thereby selecting Karaoke music easily and securely. Also, since the plurality of key terms are inputted and crosssearched, one entry song can be selected securely even if a plurality of possible entry songs are extracted provisionally.

What is claimed is:

1. A karaoke apparatus responsive to a request message for performing an entry song, comprising:

a music data storage device that stores music data representative of a plurality of entry songs;

a reference data storage device that stores reference data representative of a multiple of key items which specify the entry songs;

a collecting device that includes a microphone for collecting an oral request message and for converting the same into a corresponding voice signal;

an extraction device that analyzes the voice signal to extract therefrom key information including key terms which suggest a desired entry song;

a search device that searches the reference data storage device to identify the desired entry song by detecting coincidence between successive key terms of the key information and at least one of the key items to determine a level of coincidence between each of the key terms and a corresponding key item such that a field of possible corresponding entry songs is narrowed until the desired entry song is identified, and wherein the level of coincidence indicates a degree of matching between each of the key terms and the corresponding key item; and a performance device that retrieves music data of the desired entry song from the music data storage device to perform the desired entry song according to the retrieved music data.

2. A Karaoke apparatus according to claim 1; further comprising a display device operable when the search device identifies more than one entry song for displaying all of the identified entry songs so that the collecting device may collect another oral request message effective to select one of the identified entry songs.

3. A karaoke apparatus according to claim 1, wherein the extraction device comprises means for extracting the key information containing two or more key terms, and wherein the search device comprises means for identifying the desired entry song when perfect coincidence is detected between the key terms and the key items.

4. A Karaoke apparatus according to claim 1; wherein the reference data storage device has a multiple of reference tables corresponding to the multiple of the key items, and wherein the search device comprises means for cross-searching the multiple of the reference tables according to the key information to thereby identify the desired entry song.

5. A Karaoke apparatus according to claim 1; wherein the reference data storage device comprises means for storing reference data representative of key items including two or more of a song title, a song category, a singer's name, a song lyric phrase and a song melody pattern.

6. A Karaoke apparatus according to claim 1; wherein the extraction device comprises means for detecting phonetic elements contained in the voice signal to extract key information in the form of a key word composed of the detected phonetic elements.

7. A Karaoke apparatus according to claim 1; wherein the extraction device comprises means for detecting tone elements contained in the voice signal to extract key information in the form of a key melody pattern composed of the detected tone elements.

8. A karaoke apparatus according to claim 1, wherein the detected level of coincidence includes a perfect coincidence level, an almost perfect coincidence level and a partial coincidence level.

9. A karaoke apparatus according to claim 8, wherein:
the perfect coincidence level indicates perfect matching between a key term and the corresponding key item;
the almost perfect coincidence level indicates perfect matching between the key term and the corresponding key item except for one word difference; and
the partial coincidence level indicates partial matching between a forward part of the key term and the corresponding key item.

10. A karaoke apparatus according to claim 1, wherein the level of coincidence is determined by stepwise matching of a key term and the corresponding key item, the stepwise matching including an initial step of attempted full matching between the key term and the corresponding key item and subsequent steps of attempted lowered matching condition between the key term and the corresponding key item.

11. A karaoke apparatus according to claim 1, wherein the search device narrows the field of possible entry songs by searching a cross reference table which lists possible entry songs found by determining the level of coincidence between a previous key term and a previous corresponding key item such that a next key term is used to search the cross reference table until the desired entry song is identified.

12. A method of performing an entry song using a karaoke apparatus by responding to a request message, the method comprising the steps of:
storing music data representative of a plurality of entry songs;
storing reference data representative of a multiple of key items which specify the entry songs;
collecting an oral request message and converting the same into a corresponding voice signal;
analyzing the voice signal to extract therefrom key information including key terms which suggest a desired entry song;
searching the reference data to identify the desired entry song by detecting coincidence between successive key terms of the key information and at least one of the key items to determine a level of coincidence between each of the key terms and a corresponding key item such that a field of possible corresponding entry songs is narrowed through performing a stepwise matching of each of the key terms and the corresponding key item until the desired entry song is identified, and wherein the level of coincidence indicates a degree of matching between each of the key terms and the corresponding key item; and
retrieving music data of the desired entry song to perform the desired entry song according to the retrieved music data.

13. A method according to claim 12, further comprising the step of operating a display device when the searching identifies more than one entry song for displaying all of the identified entry songs so that another oral request message effective to select one of the identified entry songs may be collected.

14. A method according to claim 12, farther comprising the step of extracting the key information containing two or more key terms and identifying the desired entry song when perfect coincidence is detected between the key terms and the key items.

15. A method according to claim 12, further comprising the step of using multiple of reference tables corresponding to the multiple key items, and cross-searching the multiple reference tables according to the key information to thereby identify the desired entry song.

16. A method according to claim 12, further comprising the step of storing reference data representative of key items including two or more of a song title, a song category, a singer's name, a song lyric phrase and a song melody pattern.

17. A method according to claim 12, further comprising the step of detecting phonetic elements contained in the voice signal to extract key information in the form of a key word composed of the detected phonetic elements.

18. A method according to claim 12, further comprising the step of detecting tone elements contained in the voice signal to extract key information in the form of a key melody pattern composed of the detected tone elements.

19. A karaoke apparatus responsive to a request message for performing an entry song, comprising:
music data storage means for storing music data representative of a plurality of entry songs;

reference data storage means for storing reference data representative of a multiple of key items which specify the entry songs;

collecting means that include a microphone for collecting an oral request message and for converting the same into a corresponding voice signal;

extraction means for analyzing the voice signal to extract therefrom key information including key terms which suggest a desired entry song;

search means for searching the reference data storage means to identify the desired entry song by detecting coincidence between successive key terms of the key information and at least one of the key items to determine a level of coincidence between each of the key terms and a corresponding key item such that a field of possible corresponding entry songs is narrowed through performing a stepwise matching of the key term and the corresponding key item until the desired entry song is identified, and wherein the level of coincidence indicates a degree of matching between each of the key terms and the corresponding key item; and performance means for retrieving music data of the desired entry song from the music data storage means to perform the desired entry song according to the retrieved music data.

20. A karaoke apparatus according to claim 19, further comprising display means for displaying all of the identified entry songs when the search means identify more than one entry song so that the collecting means may collect another oral request message effective to select one of the identified entry songs.

* * * * *